UNITED STATES PATENT OFFICE.

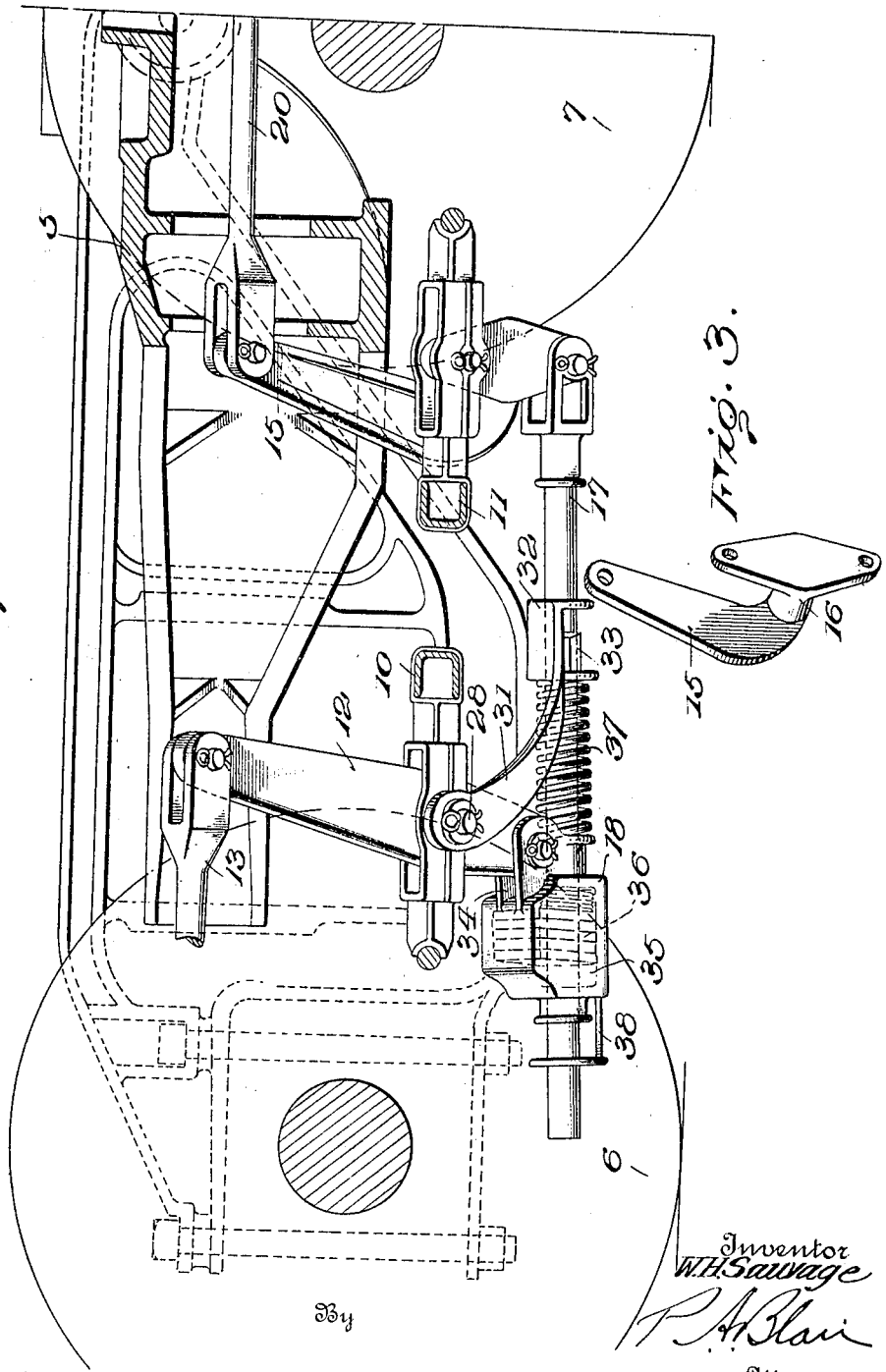

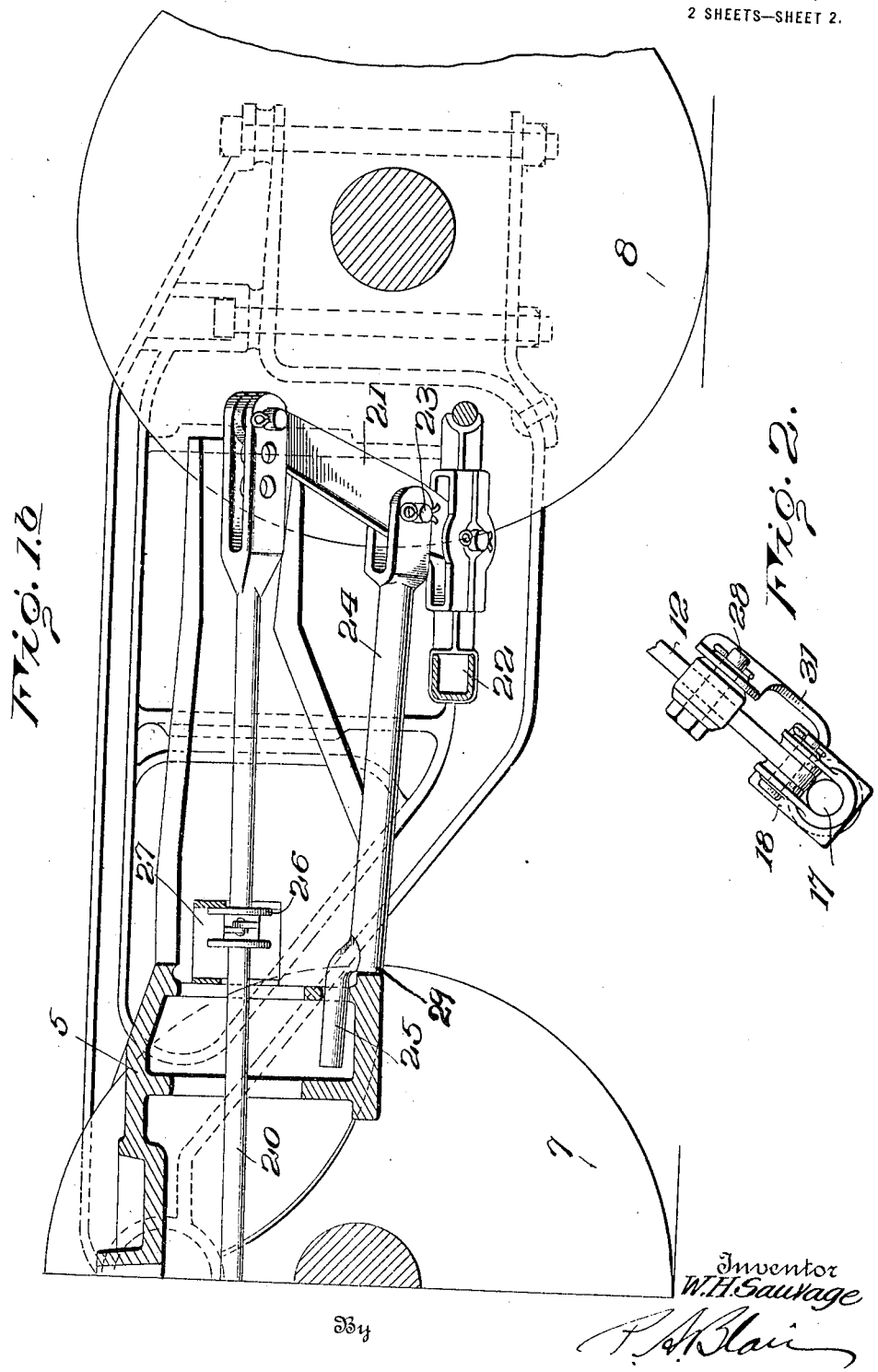

WILLIAM H. SAUVAGE, OF FLUSHING, NEW YORK, ASSIGNOR, BY MESNE ASSIGNMENTS, TO GOULD COUPLER COMPANY, OF NEW YORK, N. Y.

SLACK-ADJUSTER.

1,298,574.  Specification of Letters Patent.  Patented Mar. 25, 1919.

Application filed January 31, 1918. Serial No. 214,687.

*To all whom it may concern:*

Be it known that I, WILLIAM H. SAUVAGE, a citizen of the United States of America, residing at Flushing, Long Island, in the county of Queens and State of New York, have invented certain new and useful Improvements in Slack-Adjusters, of which the following is a specification.

This invention relates to slack adjusters and more especially to automatic slack adjusters particularly adapted for use on heavy six-wheel passenger or freight trucks, although, of course, it is not to be limited to such application as certain features are applicable to other forms of trucks.

One of the objects of the present invention is to provide a slack adjuster adapted for six-wheel trucks of simple and practical construction. Another object is to provide a slack adjuster of the above general character adapted to automatically take up the slack due to wear of the parts and more particularly the brake shoes. Another object is to provide a slack adjuster of the last above mentioned character which will be reliable and efficient in use and operation. A further object is to provide a slack adjuster having relatively few parts which will be inexpensive to manufacture and one which may be conveniently installed on six wheel trucks now in general use without material modification to either the trucks or the brake rigging.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting several modified forms have been annexed as a part of this disclosure, and in such drawings like characters of reference denote corresponding parts throughout all the views, of which:

Figures 1ᵃ and 1ᵇ together show a side elevational view, partly in section, of such parts of a complete truck as is necessary to understand the present invention, together with slack adjuster mechanism applied thereto;

Fig. 2 is an end view;

Fig. 3 is a detail perspective view of one of the levers.

Referring now to the drawings in detail, 5 denotes the framework of a six-wheel truck of standard construction particularly adapted for use on Pullman cars, the truck being provided with three wheels 6, 7 and 8 on each side, mounted in suitable journal boxes at the ends and middle of the truck in the usual manner. Between the wheels 6 and 7 are transverse brake beams 10 and 11 with associated struts for the shoes, one of which beams 10 supports a live lever 12 connected by means of a pull rod 13 with any suitable source of power such as a power cylinder (not shown) but centrally disposed beneath the car body to the left. This live lever 12 is also provided with a return spring of usual type connected at its upper end and to the truck in order to restore the parts to normal position after each operation. The second brake beam 11 is positioned transverse to the truck adjacent the central wheels and is provided with the usual brake shoe heads and shoes adapted to coact with the periphery of the central wheels in the usual manner. Associated with this brake beam is what may be termed the second live or compound lever 15 shown in Fig. 3 in detail, the lower offset end 16 of which is connected by means of a push rod 17 with the lower end of the live lever 12 through a permanent take up and holding means 18. These parts include a portion of the slack adjuster mechanism, hereinafter described more in detail.

The upper end of the lever 15 is connected by means of a rod or link 20 with the upper end of a third lever 21 supported from a transverse brake beam 22 adjacent the wheels 8. This lever, it will be noted, is supported at its lower end in the brake beam fulcrum point 23 to and has an intermediate fulcrum point 23 to which is pivotally connected a push bar 24, the opposite end of which is provided with a finger 25 passing through a hole in one of the transverse parts of the truck frame and bears against the lower portion thereof as shown at 29.

The push rod 20 is provided intermediate its points of connection with the two levers 15 and 21 with a friction clamp 26 adapted to travel between two parts of a bracket 27, as shown in Fig. 1ᵇ, thereby to provide a certain amount of lost motion to permit proper brake shoe clearance for those brakes associated with the wheels 8. These parts also constitute a portion of the slack adjuster mechanism as will hereinafter appear.

Intermediate the fulcrum point 28 of the live lever 12 and the push rod 17 is positioned an adjusting rod 31. This adjusting rod is supported at one end on the pivot point 28 of the first live lever 12. The opposite end of this adjusting rod 31 is provided with through holes in its bifurcated end 32 through which the rod 17 passes. Intermediate the bifurcated end 32 of the bracket is a friction clamp 33 adapted to grip the rod 17 yieldingly and is of less width than the distance between the bifurcations. This constitutes a predetermined lost motion device and is for the purpose of insuring proper brake shoe clearance when the brakes are in released position.

The lower end of the live lever 12 which is of standard construction is pivoted to upstanding lugs 34 on the push rod casing or housing 18 which is broadly of rectangular shape and contains holding means such as a plurality of dogs 36 having central openings with case hardened edges through which the push rod 17 passes. These dogs are normally held in canted position by means of a spring 35 acting between one of the end walls of the housing 18 and the adjacent dog. This construction permits the rod to move freely in a direction relatively toward the right, but positively prevents a reactive movement. A release spring 37 acts between the housing 18 and bracket end 32.

Thus, when the brakes are applied, motion is transmitted through the live lever 12, the housing 18 and the dogs to the push rod 17 which in turn transmits the braking action to the levers 15 and 21 and the brake beams associated therewith. A suitable unlocking lever 38 is provided adjacent the housing 18 for releasing the dogs when it is desired to apply new brake shoes to the heads as fully pointed out in my Patent No. 1,227,940, of May 29, 1917. It is, of course, to be understood that the usual return springs are associated with the brake beams adapted to aid in restoring the parts to their normal position of rest.

The operation of this device is substantially as follows:

When the brakes are applied, a pull is exerted upon the upper end of the live lever 12 from the power cylinder which causes this lever and its brake beam to move about the take up box 18 as a fulcrum thereby bringing the brake shoes into contact with the wheels 6. A reactive movement is, of course, developed which is transmitted through the push rod 17 to the lower end of the second live lever 15. This causes the brake shoes to be moved into contact with the wheels 7. The reaction will be further transmitted through the connecting link 20 to the upper end of lever 21 to move said end relatively toward the left. This lever 21 while it may be considered mechanically a live lever also acts as a dead lever with the lever 15. This motion will react on the lower end of the lever 21 by reason of its substantially rigid fulcrum point 23 in the rod 24 to cause the brake shoes associated with the beam 22 to move into engagement with the periphery of the wheels 8. If any excess travel occurs due to the wear of the parts then the friction clamp 26 will slide along the link 20 a distance equal thereto. Likewise any excess travel due to the wear of the brake shoes associated with the first live levers will cause the friction clamp 33 to slide along the rod 17 relatively toward the left.

On release of the brakes the several brake shoes will drop away from the periphery of the wheels, as provided for by the lost motion devices associated with each of the friction clamps. The live lever then continues its return to normal position under the action of the return springs, whereupon the friction clamp 26 associated with the connecting link 20 holds the parts in relatively fixed position so far as the levers 21 and their associated brake shoes are concerned, thus giving these parts the predetermined normal brake shoe clearance and the take up box 18 is then moved along the push rod 17 an amount corresponding to the excess travel of the brake rigging, due to the wear of the parts. The entire operation of the device with the exception of the replacing of the shoes is automatic.

When it is necessary to apply new brake shoes the dogs are released within the push rod housing by means of the unlocking lever 38 and the push rod moved toward the left through the housing. The brake beams are then moved away from the wheels by means of a crow-bar and new brake shoes applied.

From the above it will be seen that the invention provides a simple and practical automatic slack adjuster particularly adapted for use on six-wheel trucks, as herein set forth.

I realize that considerable variation is possible in the details of construction and arrangement of parts without departing from the spirit of my invention, and I therefore do not intend to limit myself to the specific form shown and described.

I claim:

1. In an apparatus of the character described, in combination, a six-wheel truck, a series of three levers, brake shoes associated therewith adapted to co-act with the wheels, slack adjuster mechanism between the first two levers and adjusting means between the second and third levers adapted to act upon said slack adjuster mechanism.

2. In an apparatus of the character described, in combination, a six-wheel truck, a series of live and dead levers, a push rod extending between the lower end of the first two levers, a housing carried by said push rod, permanent take up and holding means within said housing, an adjusting rod between the first live lever and one of said other parts adapted to temporarily take up the excess travel of the brake rigging, a link connecting the second and third levers, and a friction clamp associated with said link having limited movement whereby uniform brake shoe clearance is provided for the wheels.

3. In an apparatus of the character described, in combination, a six-wheel truck, a series of live and dead levers, a push rod extending between the lower end of the live lever and the second lever, a housing associated with said push rod, permanent take up and holding means within said housing, an adjusting rod between the intermediate portions of the live lever and another of said parts adapted to temporarily take up the excess travel of the brake rigging, a link connecting the upper ends of the last two levers, and a friction clamp associated with said link having limited normal movement thereby to limit the movement of the second lever and effect adjustment of the permanent take up and holding means.

4. In an apparatus of the character described, in combination, a six-wheel truck, a series of levers carrying brake shoes adapted to coact with said wheels, and slack adjuster mechanism interposed between two of said series of levers comprising a push rod between said levers, permanent take up and holding mechanism acting on said push rod, temporary take up and holding mechanism associated therewith and a spring on said push rod acting between the temporary and permanent take up and holding mechanisms.

5. In an apparatus of the character described, in combination, a six-wheel truck, a series of levers carrying brake shoes adapted to coact with said wheels and slack adjuster mechanism interposed between two of said series of levers comprising a push rod between said levers, permanent take up and holding mechanism acting on said push rod and temporary take up and holding mechanism associated therewith, and a lost motion device associated with the mechanism between each pair of levers for insuring brake shoe clearance at each wheel.

6. In an apparatus of the character described, in combination, a six-wheel truck, a series of levers carrying brake shoes adapted to coact with said wheels and slack adjuster mechanism interposed between two of said series of levers comprising a push rod between the lower ends of said levers, a rod connecting the upper ends of the second and third lever, the permanent take up and holding mechanism associated with one of said rods and a lost motion device associated with both of said rods.

7. In an apparatus of the character described, in combination, a six-wheel truck, a series of levers carrying brake shoes adapted to coact with said wheels and slack adjuster mechanism interposed between two of said series of levers comprising a push rod between the lower ends of said levers, a rod connecting the upper ends of the second and third lever, a permanent take up and holding mechanism pivoted to the lower end of side live lever and a temporary take up and holding mechanism extending between the live lever and push rod.

8. In an apparatus of the character described, in combination, a six-wheel truck, a series of levers carrying brake shoes adapted to coact with said wheels and slack adjuster mechanism interposed between two of said series of levers comprising a push rod between the lower ends of said levers, a rod connecting the upper ends of the second and third lever, a permanent take up and holding mechanism pivoted to the lower end of said first lever and a temporary take up and holding mechanism extending between the first lever and push rod, and lost motion devices associated with both of said rods.

9. In an apparatus of the character described, in combination, a six-wheel truck, a series of levers carrying brake shoes adapted to coact with said wheels and slack adjuster mechanism interposed between two of said series of levers comprising a push rod between the lower ends of said levers, a rod connecting the upper ends of the second and third lever, a permanent take up and holding mechanism pivoted to the lower end of said first lever and a temporary take up and holding mechanism extending between the first lever and push rod, and a spring acting between the temporary and permanent take up and holding mechanism.

10. In an apparatus of the character described, in combination, a six-wheel truck, a series of levers carrying brake shoes adapted to coact with said wheels and slack adjuster mechanism interposed between two of said series of levers comprising a push rod between said levers, permanent take up and holding mechanism acting on said push rod, temporary take up and holding mechanism associated therewith, an adjusting rod between said push rod and the first of said series of levers, a spring acting between the adjusting rod and the permanent take up and holding mechanism, and a rod acting between the last of the series of levers and the truck frame and loosely connected with the latter.

11. In a slack adjuster adapted for use in connection with six-wheel trucks, in combination, a live lever and a second and third combination lever, an extensible push rod connecting the live lever with the lower end of said first combination lever, a pull rod connecting the upper end of said last mentioned lever and the second combination lever, said push rod comprising two parts having extensible relations, an adjusting rod connecting the live lever with said push rod, a lost motion device associated with one of said points of connection, and a return spring mounted upon said push rod.

12. In a slack adjuster adapted for use in connection with six-wheel trucks, in combination, a series of three levers, a two-part extensible push rod connecting the lower ends of the first two levers adapted to permanently take up and hold the slack thereof, an adjusting rod extending between one of said levers and one of the parts of said push rod and return spring acting between said adjusting rod and the other part of said two-part extensible push rod, a pull rod connecting the upper ends of the second lever with the upper end of the third lever, and a link connected with the third lever and loosely connected with the truck frame adapted to act as a fulcrum for the third lever when the brakes are applied.

13. In a slack adjuster adapted for use in connection with six-wheel trucks, in combination, a series of three levers, a two-part extensible push rod connecting the lower ends of the first two levers adapted to permanently take up and hold the slack thereof, a pull rod connecting the upper end of the second lever with the upper end of the third lever, and a link connected with the third lever and loosely connected with the truck frame adapted to act as a fulcrum for the third lever when the brakes are applied, and adjusting mechanisms associated with the push rod and with the link whereby uniform brake shoe clearance will be obtained on all wheels.

14. In a slack adjuster adapted for use in connection with six-wheel trucks, in combination, a live lever and a second and third combination lever, a two-part extensible push rod connecting the live lever with the lower end of said first combination lever, a pull rod connecting the upper end of said first combination lever with the second combination lever, and permanent take up and holding means associated with the lower end of said live lever and constituting a part of said extensible push rod, and an adjusting rod connecting said live lever intermediate its ends with the other part of said extensible push rod, the point of connection between said adjusting rod and push rod constituting a lost motion device.

15. In a slack adjuster adapted for use in connection with six-wheel trucks, in combination, a live lever and a second and third combination lever, a two-part extensible push rod connecting the live lever with the lower end of said first combination lever, a pull rod connecting the upper end of said first combination lever with the second combination lever, and permanent take up and holding means associated with the lower end of said live lever and constituting a part of said extensible push rod, and an adjusting rod connecting said live lever intermediate its ends with the other part of said extensible push rod, the point of connection between said adjusting rod and push rod constituting a lost motion device, and a return spring interposed between said lost motion device and the permanent take up and holding means.

In testimony whereof I affix my signature in the presence of a witness.

WILLIAM H. SAUVAGE.

Witness:
G. H. DIETZ.